United States Patent Office.

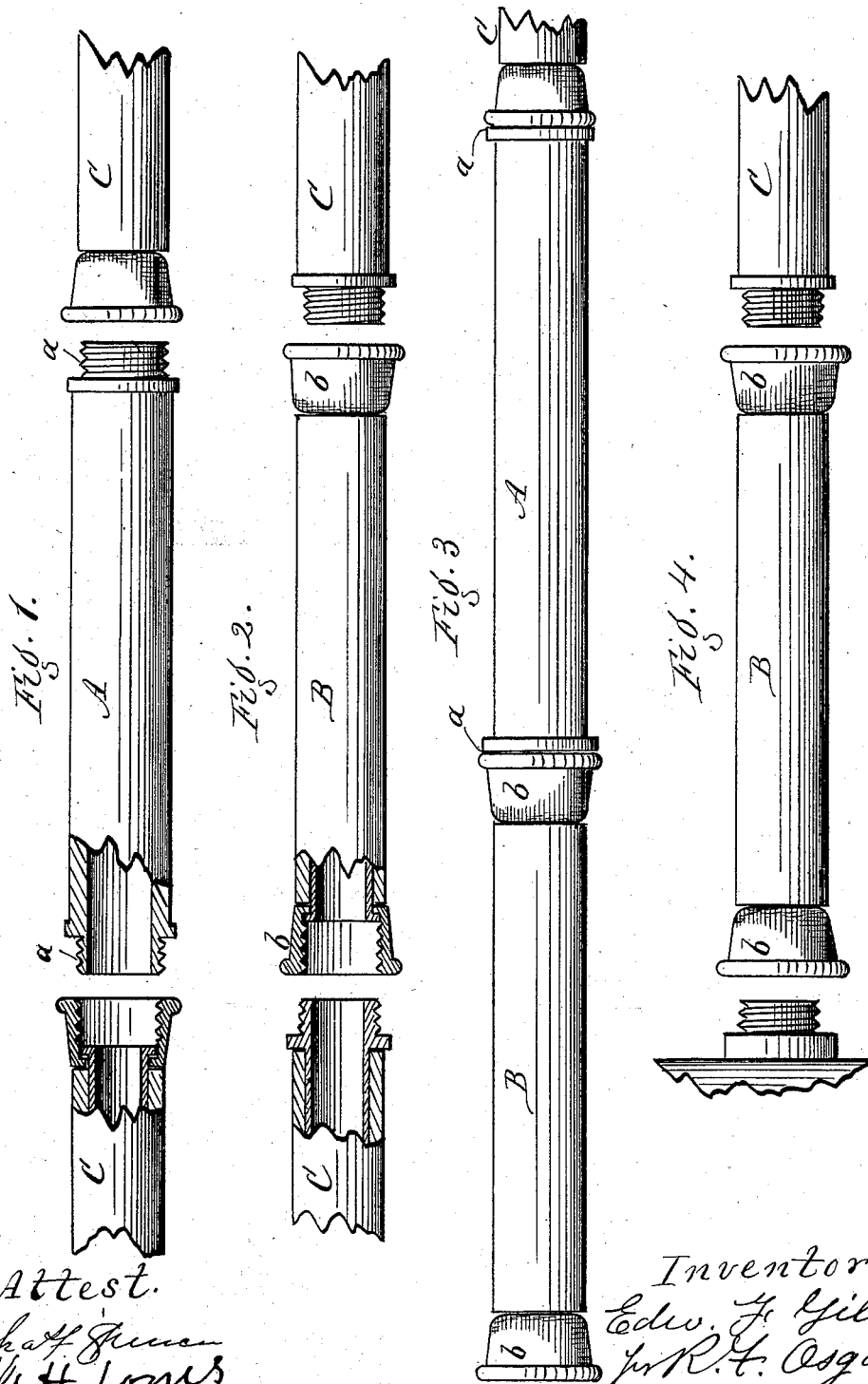

EDWARD F. GILBERT, OF LYONS, NEW YORK, ASSIGNOR OF ONE-HALF TO ALBERT G. LUCAS, OF SAME PLACE.

HOSE-CONNECTION.

SPECIFICATION forming part of Letters Patent No. 262,945, dated August 22, 1882

Application filed August 26, 1881. (No model.)

*To all whom it may concern:*

Be it known that I, EDWARD F. GILBERT, of Lyons, Wayne county, New York, have invented a certain new and useful Improvement in Hose-Connections; and I do hereby declare that the following is a full, clear, and exact description of the same, reference being had to the accompanying drawings, in which—

Figures 1 and 2 are views showing the two connections or tubes forming my improvement, located between two connecting lengths of hose, but disconnected therefrom. Fig. 3 is a view showing the two connections attached to the end of one length of hose. Fig. 4 is a view similar to Fig. 1, but showing one of the connections located between a length of hose and the discharge-nozzle of a hydrant or fire-engine.

My improvement relates to hose-connections for the meeting ends of long lengths of hose, or for connecting the end of a long length of hose with the nozzle of a hydrant or fire-engine.

Water-hose is usually made in lengths of about fifty feet, and has at one end a male coupling and at the other end a female coupling. When united in a continuous length it is wound upon a reel, with a female end standing outward, so that as it is unwound it can be screwed directly to the nozzle. At fires it is frequently the case that the hose on one cart will not reach to the fire, and it is necessary to connect with the hose of another cart. In such case the two female ends come together, and the whole length of hose on one cart has to be shifted or reversed end for end, causing much trouble and delay. Again, the hose-cart, in unreeling, has to start from the hydrant or engine and run toward the fire, thus frequently going over the same ground it has already gone over in coming to its destination. It also has to wait for the engine to be located, and has to be moved up to place before it can start to unreel. Again, it is frequently the case that the hose is reeled on the wrong way through accident or inattention, in which case, when it is unreeled, starting from the engine, the two male ends of the couplings come together, and the hose then has to be shifted or reversed end for end.

To remedy these difficulties my invention consists of two short pipe connections or tubes, one of which has male couplings on both ends and the other has female couplings on both ends, said connections being made an attachment to the length of hose, whereby the connection of two lengths of hose or a single length with a hydrant or engine is readily made, as hereinafter more fully described.

In the drawings, A B represent the two short pipe-connections, which may be made either of metal or of flexible material, such as rubber or leather. At the ends of the connection A are two male couplings, *a a*, and at the ends of the connection B are two female couplings, *b b*, as clearly shown in Figs. 1 and 2. These couplings are of ordinary form. The connections are usually made but a few inches in length. C C represent the long lengths of hose which are wound upon the reels. When so wound the two connections A B are screwed together, and to the last end of the hose, as shown in Fig. 3, so that when drawn off they meet the nozzle of the hydrant or engine or the connecting end of another length of hose.

In ordinary use, and when the hose is properly wound, the connection B, as it comes off, will connect with the nozzle in the usual way. The hose can be reeled off either toward or away from the fire. If the male coupling comes to the nozzle, the connection B is interposed, which remedies the difficulty. By this means the hose-cart can unreel from the fire toward the engine without trouble, and with no delay. In the case of two meeting lengths of hose, as shown in Figs. 1 and 2, if the female couplings come together, as in Fig. 1, the connection B is removed and the connection A unites the parts. If the male couplings come together, the two connections fit without change.

Having thus described my invention, I claim—

In a flexible hose, the main reel-length C, provided at its discharge end with two short coupling-sections, A B, screwed together and to the main length, one having male couplings at both ends and the other having female couplings at both ends, whereby connection may be made with either a male or a female coupling on another length of pipe or a hydrant or a fire-engine by screwing the outer section thereto or by removing the outer section and screwing the inner section thereto, as herein shown and described.

In witness whereof I have hereunto signed my name in the presence of two subscribing witnesses.

EDWARD F. GILBERT.

Witnesses:
A. H. GATES,
THAD COLLINS, Jr.